United States Patent
Reynolds et al.

(10) Patent No.: US 10,384,503 B2
(45) Date of Patent: Aug. 20, 2019

(54) TOW HITCH ASSEMBLY

(71) Applicant: J. C. Bamford Excavators Limited, Uttoxeter, Staffordshire (GB)

(72) Inventors: Timothy James Reynolds, Uttoxeter (GB); Stephen Paul Slater, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 0 days.

(21) Appl. No.: 15/607,176

(22) Filed: May 26, 2017

(65) Prior Publication Data

US 2017/0341477 A1  Nov. 30, 2017

(30) Foreign Application Priority Data

May 27, 2016 (GB) .................................. 1609404.7

(51) Int. Cl.
    *B60D 1/06* (2006.01)
    *B60D 1/44* (2006.01)
    (Continued)

(52) U.S. Cl.
    CPC .............. *B60D 1/54* (2013.01); *B60D 1/06* (2013.01); *B60D 1/065* (2013.01); *B60D 1/44* (2013.01);
    (Continued)

(58) Field of Classification Search
    CPC ... B60D 1/54; B60D 1/56; B60D 1/40; B60D 1/44; B60D 2001/001; B60D 2001/544; B60D 1/06; B60D 1/065; E02F 3/286; E02F 3/382; B62J 1/065; B62J 2001/085

USPC ................. 280/479.2, 478.1, 479.3, 482, 280/491.1–491.3, 495–497, 499; 414/686, 703; 172/446

See application file for complete search history.

(56) References Cited

U.S. PATENT DOCUMENTS 4,266,799 A * 5/1981 Wood ...................... B60D 1/06
                                                    280/482
4,714,265 A   12/1987 Franklin
(Continued)

FOREIGN PATENT DOCUMENTS

CA          1142199 A    3/1983

OTHER PUBLICATIONS

Search Report for GB 1609404.7, dated Sep. 28, 2016.
(Continued)

*Primary Examiner* — Anne Marie M Boehler
(74) *Attorney, Agent, or Firm* — Marshall, Gerstein & Borun LLP

(57) ABSTRACT

A tow hitch assembly having a body for mounting the tow hitch assembly relative to an associated vehicle includes a first member rotatably mounted relative to the body and a second member slideably mounted relative to the first member, with the second member including a tow hitch. The tow hitch assembly includes a stowed position at which the first member is in a first rotational position relative to the body and the second member is in a first longitudinal position relative to the first member. Further, the tow hitch assembly includes a deployed position at which the first member is in a second rotational position relative to the body and the second member is in a second longitudinal position relative to the first member.

18 Claims, 14 Drawing Sheets

(51) Int. Cl.
  *B60D 1/54* (2006.01)
  *B60D 1/00* (2006.01)

(52) U.S. Cl.
  CPC .. *B60D 2001/001* (2013.01); *B60D 2001/544* (2013.01)

(56) References Cited

U.S. PATENT DOCUMENTS

| | | | |
|---|---|---|---|
| 5,000,473 A | 3/1991 | Johnson | |
| 5,213,354 A | 5/1993 | Vaughn | |
| 5,547,210 A * | 8/1996 | Dugger | B60D 1/36 280/477 |
| 5,803,475 A * | 9/1998 | Dick | B60R 3/007 280/163 |
| 6,644,680 B1 * | 11/2003 | Coe | B60D 1/36 280/477 |
| 6,729,637 B2 * | 5/2004 | Wolters | B60D 1/02 280/491.1 |
| 7,052,032 B1 * | 5/2006 | Adair | B60D 1/06 280/479.3 |
| 7,559,568 B2 * | 7/2009 | Planz | B60D 1/07 280/416 |
| 7,669,876 B2 * | 3/2010 | Kerpash, Sr. | B60D 1/54 280/479.2 |
| 8,474,852 B1 * | 7/2013 | Granados | B60D 1/36 280/478.1 |
| 2004/0091347 A1 * | 5/2004 | Hackett | B28C 5/4272 414/685 |
| 2004/0135346 A1 | 7/2004 | Moss | |
| 2010/0148471 A1 | 6/2010 | McConnell | |
| 2011/0036129 A1 | 2/2011 | Frantz | |
| 2011/0101645 A1 | 5/2011 | Williams, Jr. et al. | |
| 2012/0198734 A1 | 8/2012 | Murray | |
| 2014/0265241 A1 | 9/2014 | Korhonen et al. | |
| 2015/0191063 A1 | 7/2015 | Fincher | |

OTHER PUBLICATIONS

Extended Search Report for European Patent No. 17172868.6, dated Mar. 27, 2018.
Partial Search Report for European Patent No. 17172868.6, dated Oct. 25, 2017.

* cited by examiner

TOW HITCH ASSEMBLY

FIELD OF THE INVENTION

The present invention relates to a tow hitch assembly, in particular a tow hitch assembly for use on a material handling tow vehicle, for example a back hoe loader or the like.

BACKGROUND OF THE INVENTION

Known back hoe loaders utilize a back hoe to manipulate and move material, for example when digging a trench or the like. When digging a trench, the trench can be dug right up to the back of the vehicle. As such no part of the vehicle should hinder operation of the back hoe when digging such a trench. In order to move from one site to another, back hoe loaders can be driven along the road with the back hoe stored in a transport position. The back hoe, in the stored position, necessarily projects beyond the back of the chassis of the back hoe loader. When travelling from site to site, it may be advantageous for the back hoe loader to act as a tow vehicle and tow a trailer or the like in order to carry additional supplies, tools etc.

Thus, there is a need for a tow hitch assembly for a tow vehicle such as a back hoe loader which is capable of towing a trailer or the like, but which does not hinder operation of the back hoe when operating the back hoe.

SUMMARY OF THE INVENTION

Thus, according to the present invention there is provided a tow hitch assembly having a body for mounting the tow hitch assembly relative to an associated vehicle,
a first member rotatably mounted relative to the body and
a second member slideably mounted relative to the first member, the second member including a tow hitch,
the tow hitch assembly having a stowed position at which the first member is in a first rotational position relative to the body and the second member is in a first longitudinal position relative to the first member and
the tow hitch assembly having a deployed position at which the first member is in a second rotational position relative to the body and the second member is in a second longitudinal position relative to the first member.

The first member may be rotatably mounted via a pivot having a pivot axis that, in use, is substantially vertical.

The first member may be locked in the first position and the second position by a lock member.

The lock member may engage a first part of the body and a first part of the first member to lock the first member in the first rotation position and the lock member engages the first part of the body and a second part of the first member to lock the first member in the second rotation position.

The lock member may engage a first part of the body and a first part of the first member to lock the first member in the first rotation position and the lock member engages a second part of the body and the first part of the first member to lock the first member in the second rotation position.

The second member may be locked in the first longitudinal position and second longitudinal position by a lock device.

The lock device may engage a first region of the first member and a first region of the second member to lock the second member in the first longitudinal position and the lock device engages the first region of the first member and a second region of the second member to lock the second member in the second longitudinal position.

The lock device may engage a first region of the first member and a first region of the second member to lock the second member in the first longitudinal position and the lock device engages a second region of the first member and the first region of the second member to lock the second member in the second longitudinal position.

The first member may include a tube within which is slideably mounted the second member.

The body may have a first planar section connected to a second planar section, the first planar section being generally parallel to the second planar section wherein the first member is partially received between the first planar section and the second planar section.

The first member may be rotatably mounted via a pivot pin wherein the pivot pin engages the first planar section and the second planar section.

The first planar section may be connected to a second planar section via a first web and a second web.

The first web may be orientated at substantially 90° to the second web to allow the first member to rotate through 90° or substantially 90°.

The body may have a mounting feature to allow the tow hitch assembly to be mounted to an associated vehicle.

According to another aspect of the present invention there is provided a material handling machine including a tow hitch assembly having a body for mounting the tow hitch assembly relative to an associated vehicle,
a first member rotatably mounted relative to the body and
a second member slideably mounted relative to the first member, the second member including a tow hitch,
the tow hitch assembly having a stowed position at which the first member is in a first rotational position relative to the body and the second member is in a first longitudinal position relative to the first member and
the tow hitch assembly having a deployed position at which the first member is in a second rotational position relative to the body and the second member is in a second longitudinal position relative to the first member.

The material handling machine may be a back hoe loader and when the tow hitch assembly is in the deployed position the second member extends under a back hoe of the back hoe loader when the back hoe is in a stowed position.

The second member may be elongate and defines a longitudinal axis and when the tow hitch assembly is in the stowed position the longitudinal axis extends laterally relative to the material handling machine.

The mounting feature may have a generally U-shaped cross section having a first arm and a second arm and the first arm is positioned on one side of a chassis beam of the material handling machine and a second arm is positioned on an opposite side of the chassis beam.

The mounting feature may at least extend around a front of the chassis beam and the back hoe is laterally slideably mounted on the chassis beam and positioned behind the chassis beam.

BRIEF DESCRIPTION OF THE DRAWINGS

The invention will now be described, by way of example only, with reference to the accompanying drawings in which.

DETAILED DESCRIPTION OF THE INVENTION

Figure 1:
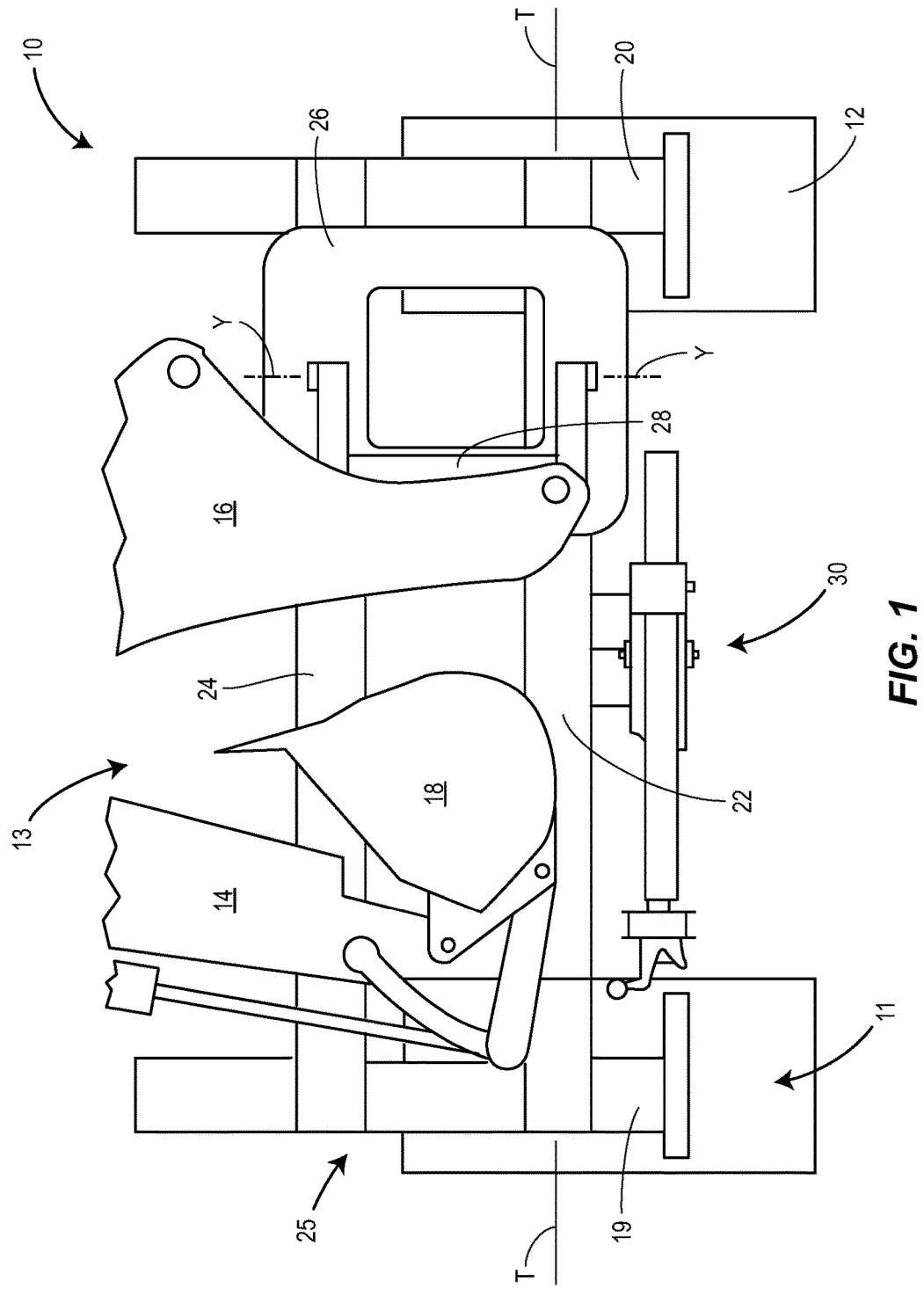
FIG. 1 is a rear elevation of a vehicle including a tow hitch assembly according to the present invention in a stowed position.

With reference to FIGS. 1 to 4, there is shown a vehicle 10 including a tow hitch assembly according to the present invention. The vehicle 10 has rear ground engaging wheels 11 and 12. In this case ground engaging wheels 11 and 12 are not steerable. The vehicle 10 has left and right stabilizer housings 19 and 20 which are attached to both of an upper cross rail 24 and a lower cross rail 22. The left and right stabilizer housings 19 and 20 and upper and lower cross rails 24 and 22, together form a rear chassis frame 25. The lower cross rail 22 defines a transverse axis T which is orientated substantially parallel to an axle (not shown) on which the rear ground engaging wheels 11 and 12 are mounted.

The vehicle 10 includes a yoke 26 which is slideably mounted on the upper and lower cross rails 24 and 22. The vehicle 10 further includes a swing tower 28 and a conventional backhoe 13. The backhoe 13 includes boom 16, a dipper arm 14 and a bucket 18. Bucket 18 is pivotally attached to a first end of the dipper 14, the dipper 14 includes a second end distal to the first end, the second end of dipper 14 is pivotally attached to a first end of boom 16. Boom 16 includes a second end distal to the first end, the second end is pivotally attached to the swing tower 28. The backhoe is operable in a conventional manner. The swing tower 28 is pivotally attached to a yoke 26 and the swing tower 28 is rotatable relative to the yoke 26 about a substantially vertical axis Y.

The yoke 26 is mounted to the upper and lower cross rails 24 and 22. The yoke 26 is mounted slideably upon upper and lower cross rails 24 and 22, such that, the yoke 26 can be translated along the upper and lower cross rails 24 and 22, in the direction of the transverse axis T.

The rear chassis frame 25 is rigidly mounted to a chassis member 21. A longitudinal axis L is shown (see FIG. 9), the longitudinal axis L runs from the front to the rear of the vehicle 10. A departure clearance line A is shown. The angle between departure clearance line A and longitudinal axis L gives the departure angle of the vehicle 10. In this case the departure angle X of the vehicle 10 is 24°.

Figure 2:
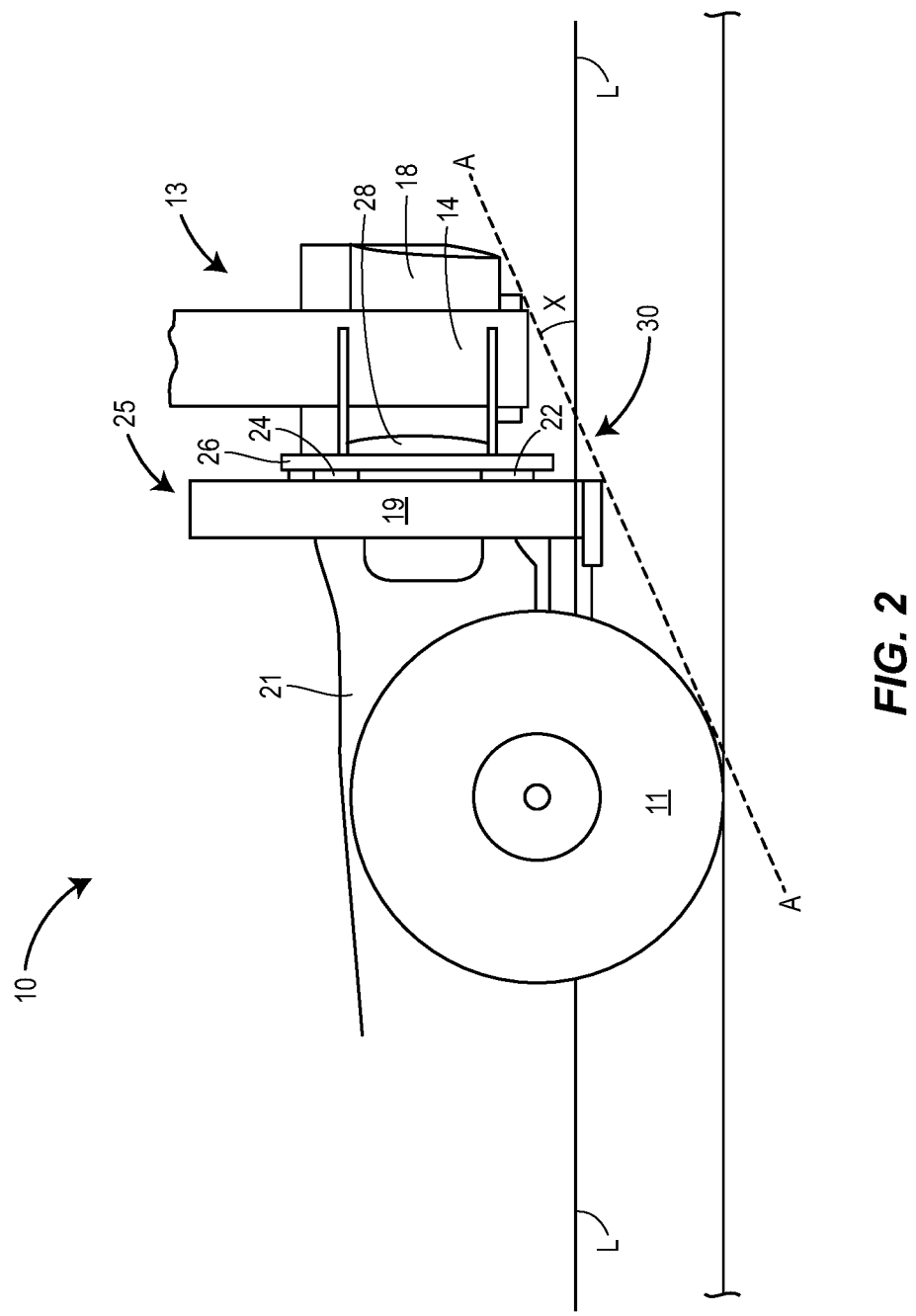
FIG. 2 is a left hand side elevation of the vehicle of FIG. 1 including the tow hitch assembly in a stowed position.
Figure 3:
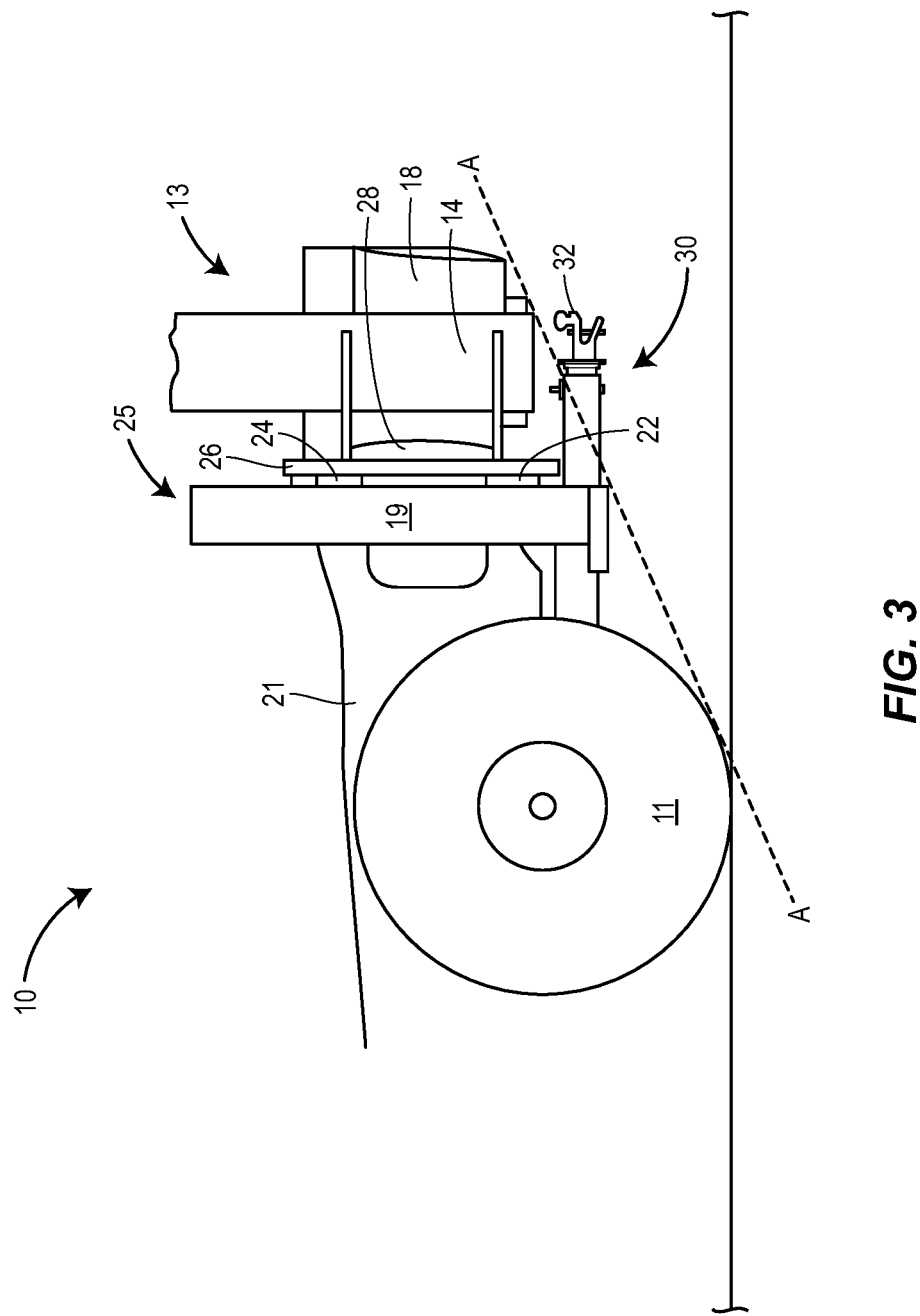
FIG. 3 is a left hand side elevation of the vehicle of FIG. 1 including the tow hitch assembly in a rotated position.
Figure 5:
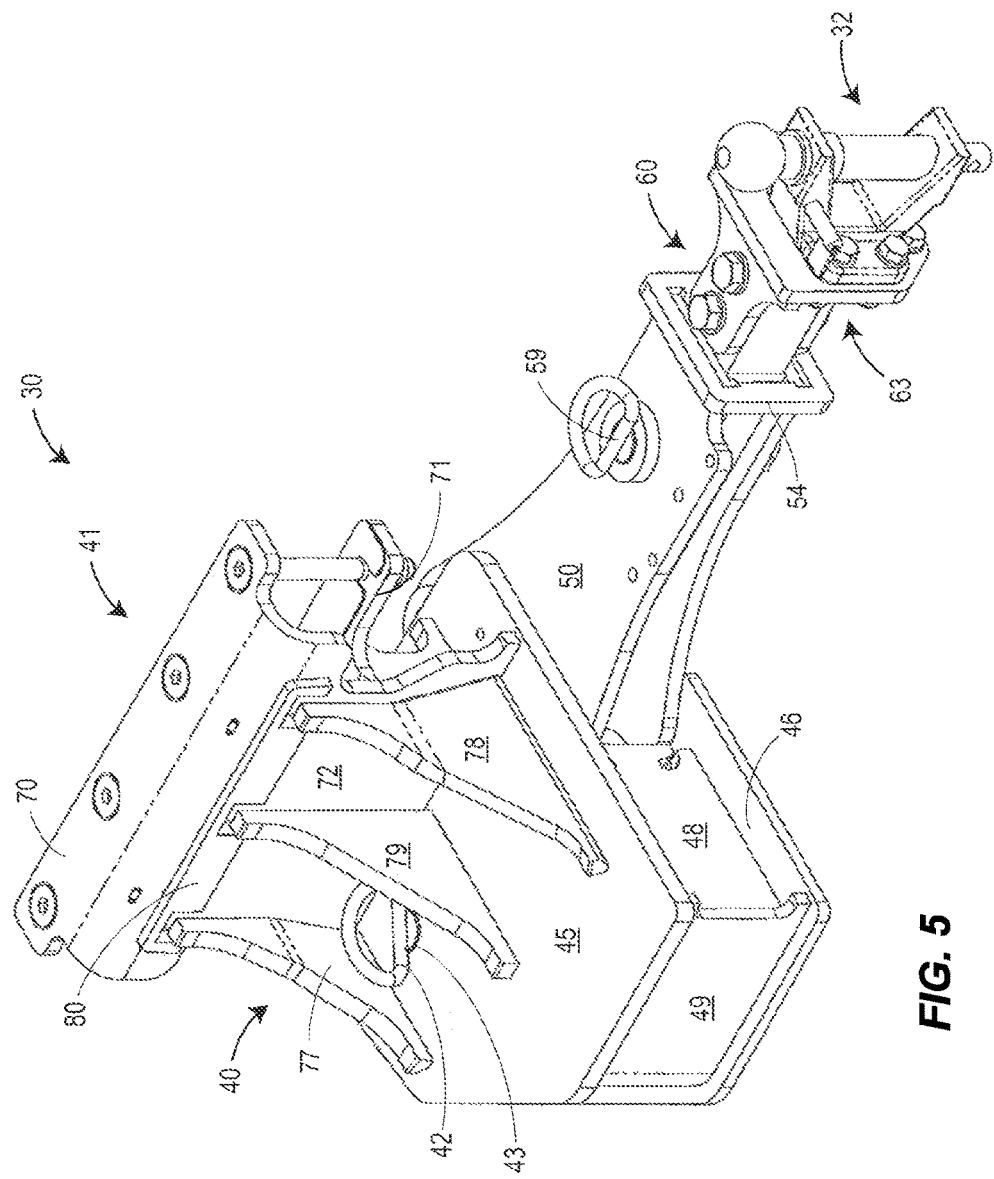
FIG. 5 is an isometric view of the tow hitch assembly of FIG. 1 in a stowed position.
Figure 5A:
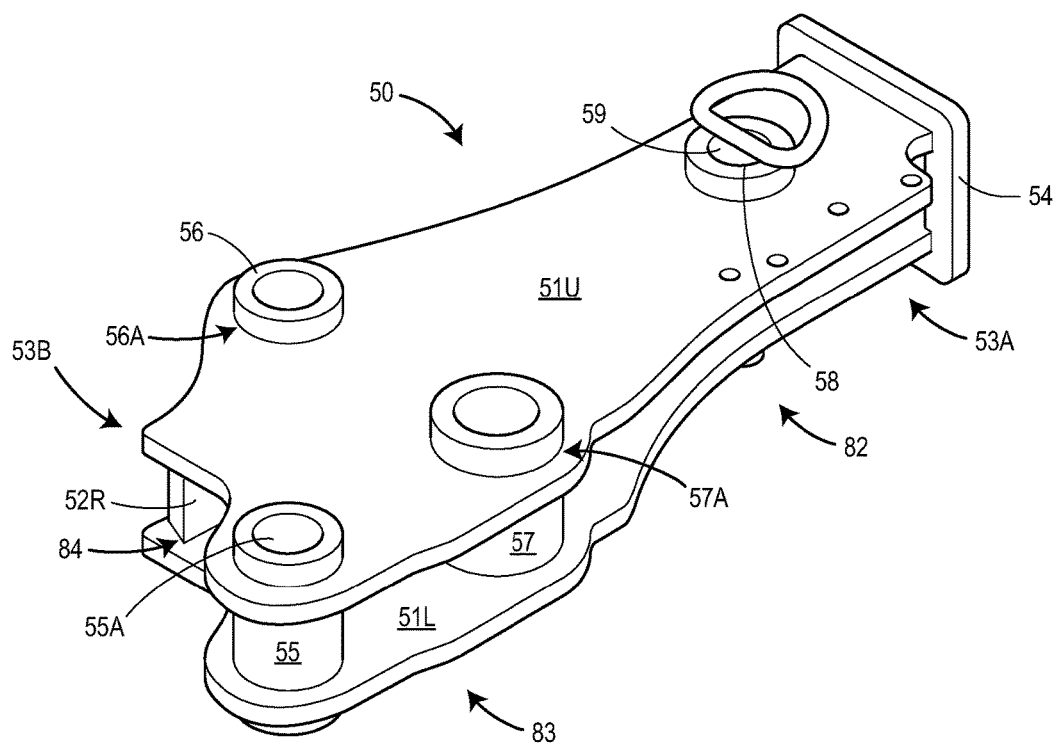
FIG. 5A is an isometric view of the first member of the tow hitch assembly of FIG. 1.

The vehicle 10 further includes a tow hitch assembly 30. In this case the tow hitch assembly 30 is obscured from view by the left stabilizer housing 19. In FIGS. 1, 2 and 5, the tow hitch assembly 30 is in a stowed position. It can be seen that no part of the tow hitch assembly protrudes beyond departure clearance line A (see FIG. 2). Since no part of the tow hitch assembly 30 protrudes beyond departure clearance line A, the tow hitch assembly has no effect on the departure angle of the vehicle, when in a stowed position as shown in FIG. 2.

With reference to FIGS. 5 to 8, there is shown the tow hitch assembly 30. The main components of the tow hitch assembly 30 are a body 40, a first member 50, a second member 60, a lock member in the form of pin 42, a lock device in the form of pin 59, and a pivot pin 92 (see FIG. 8).

The body 40 includes a first planar section 45, a second planar section 46, a first web 47 (see FIG. 8), a second web 48, a third web 49, a mounting portion 41, a pivot hole 44, a first part in the form of lock holes 43, a left connecting web 78, a right connecting web 77, a central connecting web 79 and a reinforcing plate 80.

Figure 8:
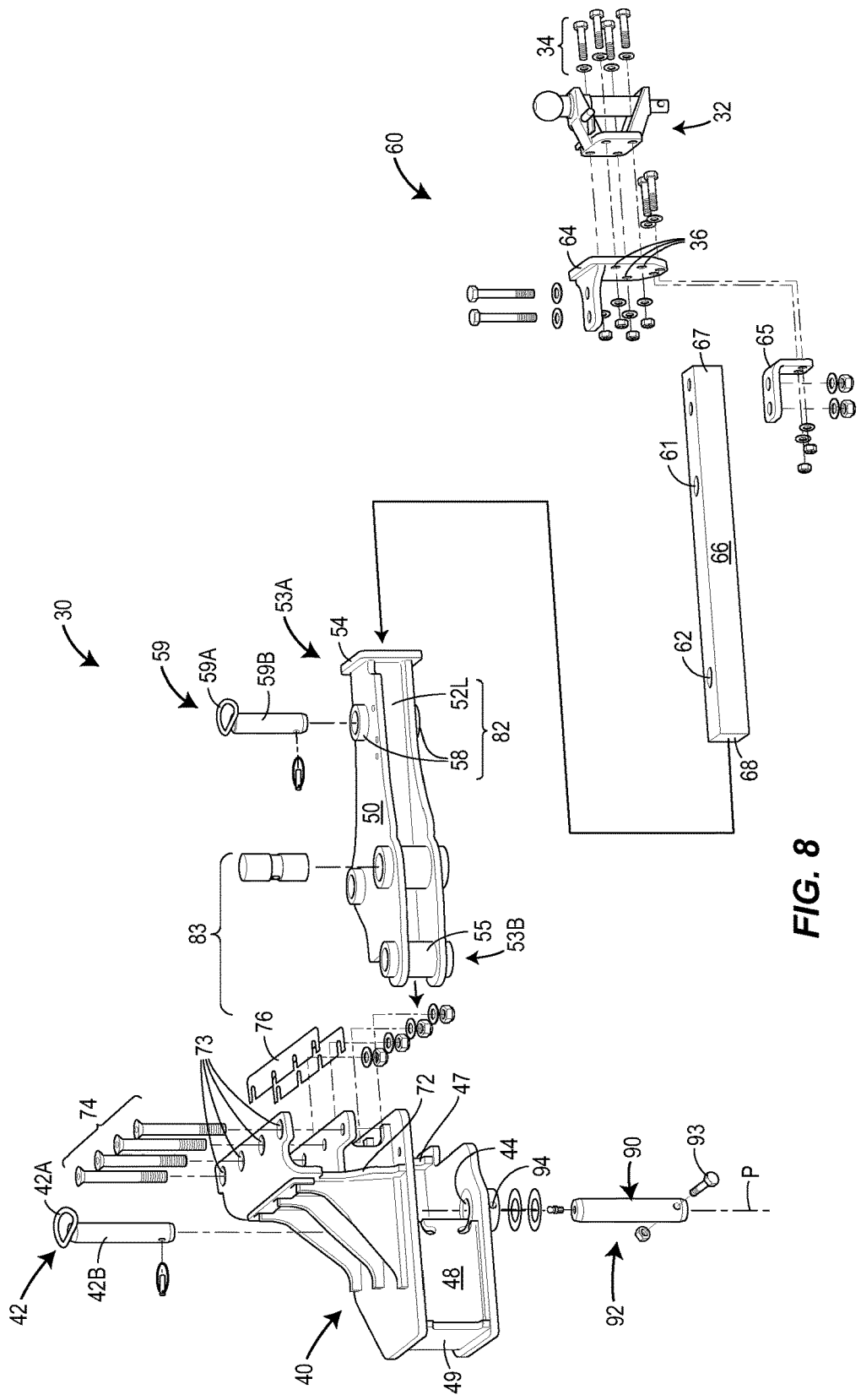
FIG. 8 is an exploded view of the tow hitch assembly of FIG. 7.

The mounting portion 41 includes a front plate 72, a first arm 70, a second arm 71, and holes 73 (see FIG. 8). The mounting portion 41 defines a mounting feature of the body 40.

The mounting portion 41 has a generally F-shaped cross section. The first arm 70 and the front plate 72 are formed from a single plate which is bent such that it has an L-shaped cross section. The first arm 70 is bent substantially perpendicular to the front plate 72. The second arm 71 is connected to the front plate 72, parallel to the first arm 70 and substantially perpendicular to the front plate 72 to form the F-shaped cross section of the mounting portion 41. The first arm 70 and second arm 71 each have four holes 73. Each of the four holes 73 in the first arm 70 has a corresponding hole in the second arm 71. The holes 73 in the first arm 70 and second arm 71 are coaxially aligned in pairs.

The mounting portion 41 is attached to the first planar section 45 by the connecting webs 77, 78, 79 and the lower portion of the front plate 72. The left connecting web 78, right connecting web 77 and central connecting web 79 are substantially similar. The left connecting web 78 and right connecting web 77 are both formed to have a bend when viewed from the front. The central connecting web 79 has a linear profile when viewed from the front. The bend in each of the left connecting web 78 and right connecting web 77 are concave towards the central connecting web 79. The connecting webs 77, 78 and 79 are welded perpendicularly to the lower portion of the front plate 72 at one edge and welded to the top of the first planar section 45 at another edge. The uppermost weld between the connecting web 77, 78 and 79 and the front plate 72 are also welded to the reinforcing plate 80. The mounting portion 41 is positioned vertically above the first planar section 45. The connecting webs 77, 78, 79 and the front plate 72 extend from the mounting portion 41 downwards to the first planar section 45 such that the first planar section 45 is suspended below and substantially parallel to the second arm The first planar section and second planar section 45 and 46 have substantially the same shape when viewed in a plan perspective, and each of the first and second planar sections 45 and 46 includes the coaxially aligned pivot hole 44 (see FIG. 8) and the coaxially aligned lock holes 43. The second planar section 46 is spaced apart from the first planar section 45 by the first web 47 the second web 48 and the third web 49. The first web 47 and the second web 48 are substantially perpendicular to both the first planar section 45 and second planar section 46. The first and second webs 47, 48 are orientated substantially perpendicular relative to each other. The third web 49 is orientated substantially parallel relative to the first web 47 and adjacent and substantially perpendicular relative to the second web 48.

The first member 50 includes an upper flange 51U, a lower flange 51L, a left flange 52L (see FIG. 8), a right flange 52R, a first end 53A, a second end 53B, a mouth plate 54, a first part in the form of tube 55, a second part in the form of tube 56, a pivot tube 57, a first region in the form of upper and lower holes 58, a first hole 55A, a second hole 56A, and a third hole 57A.

Each of tubes 55 and 56 are substantially similar. Tube 57 is similar to tubes 55 and 56 and has a larger internal bore diameter and larger external diameter than tubes 55 and 56.

The upper flange 51U and lower flange 51L are in the form of plates and have substantially the same shape when viewed from a planned perspective. Each of the upper flange 51U and lower flange 51L have the four corresponding holes 55A, 56A, 57A and 58. The upper flange 51U and lower flange 51L are in the form of plates having an elongate portion 82 and a broad base portion 83. The plates have substantially the same shape when viewed in a plan perspective. Each of the upper flange 51U and lower flange 51L have four holes 55A, 56A, 57A, and 58. The elongate portion 82 tapers away from the broad base portion 83 to define a first end 53A. The end of the upper flange 51U and lower flange 51L distal to the first end 53A defines the second end 53B.

The left flange 52L and right flange 52R are in the form of plates and have substantially the same shape when viewed in a plan perspective. The left and right flanges 52L and 52R have the shape of an elongate rectangle.

The upper flange 51U and lower flange 51L are spaced apart by the left flange 52L and right flange 52R. The left flange 52L and right flange 52R are positioned substantially perpendicular to both the upper flange 51U and lower flange 51L. The left and right flanges 52L and 52R are welded to each of the upper flange 51U and lower flange 51L to create an internal box section 84 between the first end 53A and second end 53B. Tubes 55, 56 and 57 are positioned respectively in holes 55A, 56A and 57A of the upper and lower flanges 51U and 51L and welded in place. The tubes 55, 56 and 57, do not intersect the box section created by welding the left and right flanges 52L and 52R to the upper and lower flanges 51U and 51L. The mouth plate 54 is welded to the first end 53A of the upper and lower flanges 51U and 51L and the left and right flanges 52L and 52R such that it encircles the opening of the box section 84 at the first end 53A of the first member 50.

The second member 60 includes an elongate body 66, a mounting flange 63, and a tow hitch 32.

Figure 5B:
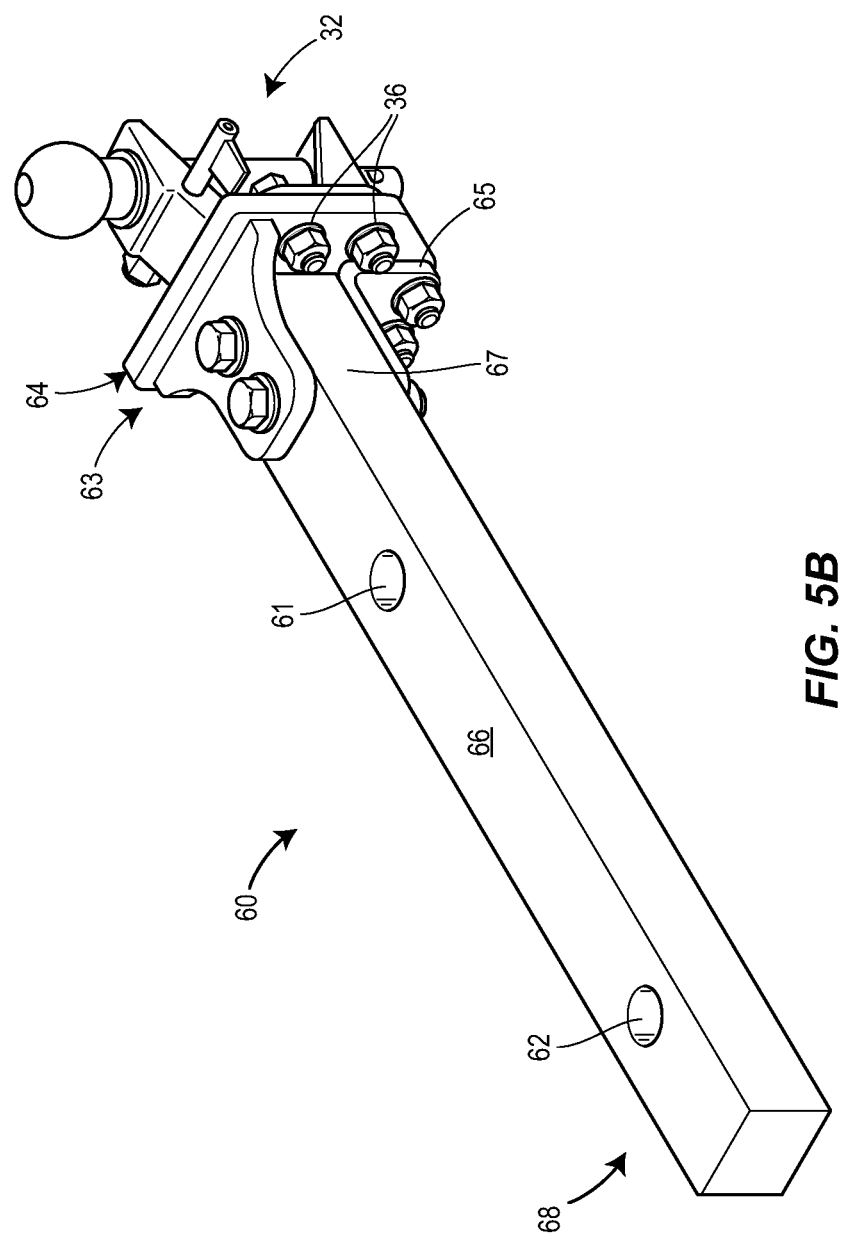
FIG. 5B is an isometric view of the second member of the tow hitch assembly of FIG. 1.

The elongate body 66 includes a first end 67, a second end 68, a first region in the form of holes 61 and a second region in the form of holes 62 (see FIG. 5B).

The elongate body 66 has a rectangular cross section and is constructed from a single solid member. The elongate body 66 has an external size such that it can be received within the box section 84 of the first member 50.

The holes 62 are positioned proximate the second end 68 of the elongate body 66, and the holes 61 are positioned further towards the first end 67 of the elongate body 66 relative to the holes 61 (see FIG. 5B).

The mounting flange 63 includes a mounting bracket 64 and a support bracket 65 (see FIG. 8).

The mounting bracket 64 has a horizontal plate and a vertical plate which are welded together substantially perpendicularly tow hitch holes 36 and tow hitch bolts 34. The horizontal plate has two through holes positioned one in front of the other, relative to the weld with the vertical plate. The tow hitch holes 36 are positioned in the vertical plate, in a quadrilateral drill pattern, two further holes are positioned horizontally next to each other below the quadrilateral drill pattern formed by the tow hitch holes 36.

The support bracket is in the form of a plate which is being bent such that it has a horizontal section and a vertical section, the horizontal and vertical sections being substantially perpendicular to one another. The vertical section has two through holes, one in front of the other, relative to the bend in the plate which forms the support bracket 65. The vertical section of the plate 65 which forms the support bracket has two holes drilled side by side horizontally.

The tow hitch 32 is a conventional detachable flange, ball and pin tow hitch.

The mounting flange 63 is positioned at the first end 67 of the second member 60. The mounting bracket 64 and the support bracket 65 are positioned above and below the elongate body 66 such that the two holes in the horizontal portion of each of the mounting bracket 64 and support bracket 65 are coaxially aligned and bolts can received therethrough in a conventional manner (see FIG. 8) where the bolts are bolted through the horizontal portions of the mounting bracket 64 and support bracket 65 and the two corresponding holes in the first end 67 of the elongate body 66. The bottom two most holes on the vertical portion of the mounting bracket 64 align coaxially with the two holes on the vertical portion of the support bracket 65 and are bolted together in a conventional manner. See FIG. 8. The tow hitch holes 36 on the vertical portion of the mounting bracket 64 are bolted using tow hitch bolts 34 to corresponding holes in a conventional manner thereby attaching the tow hitch 32 to the mounting flange 63.

Pin 59 comprises a D-shaped pull ring 59A and a cylindrical body 59B.

Pin 59 is received in holes in the elongate portion 82 of the first member 50.

Pin 42 comprises a D-shaped pull ring 42A and a cylindrical body 42B. The pin 42 is substantially identical to the pin 59.

Pin 42 is received in holes 43 in the first part 41 of the body 40 and is positioned in the first planar section 45 to the right of the central connecting web 79.

A pivot 90 includes the pivot pin 92. The pivot pin 92 is a cylindrical member with a through hole at one end to receive a securing pin 93, and fasten the pivot pin 92 to a securing hole 94 thereby fixing the pivot pin 92 longitudinally in place relative to the pivot axis P in a conventional manner (see FIG. 8).

The pivot 90 is positioned in the first planar section 45 to the left hand side of the central connecting web 79. The pivot 90 defines a pivot axis P which is perpendicular to the first planar section 45 and the second planar section 46, and, parallel to the first web 47 and second web 48.

Figure 6:
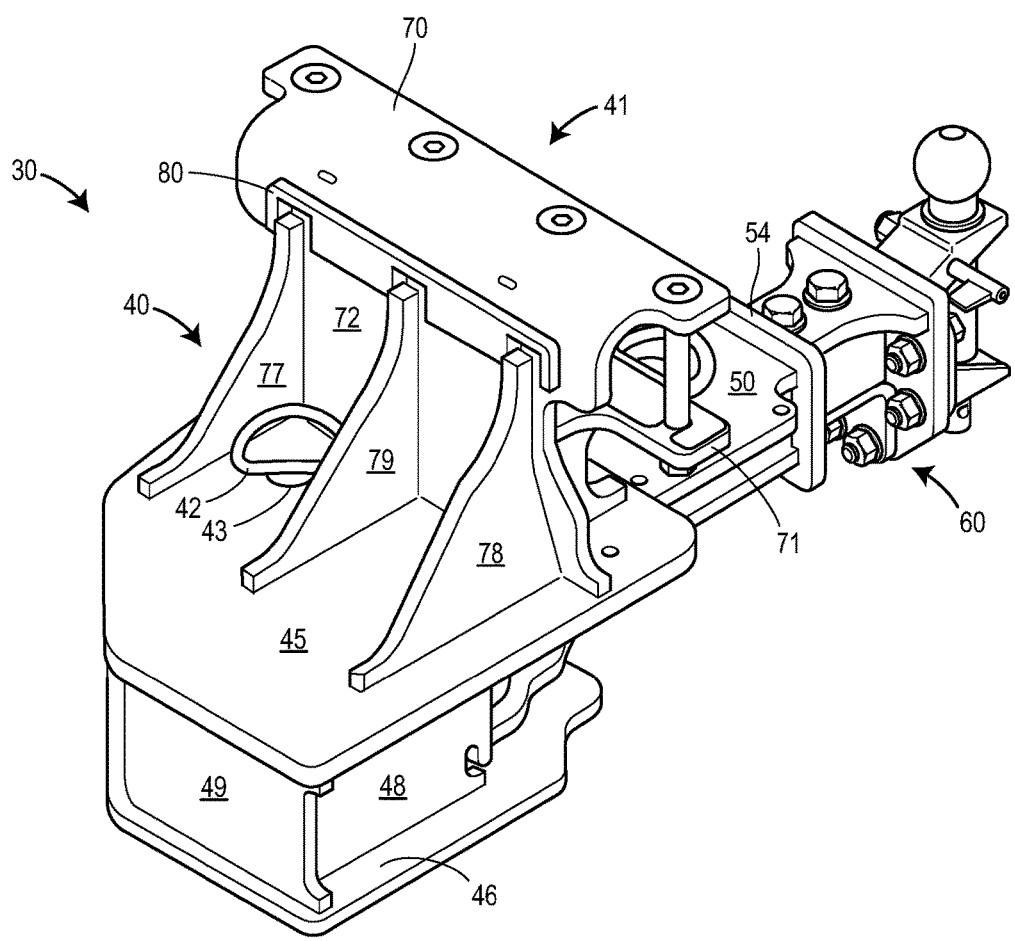
FIG. 6 is an isometric view of the tow hitch assembly of FIG. 1 in a rotated position.
Figure 7:
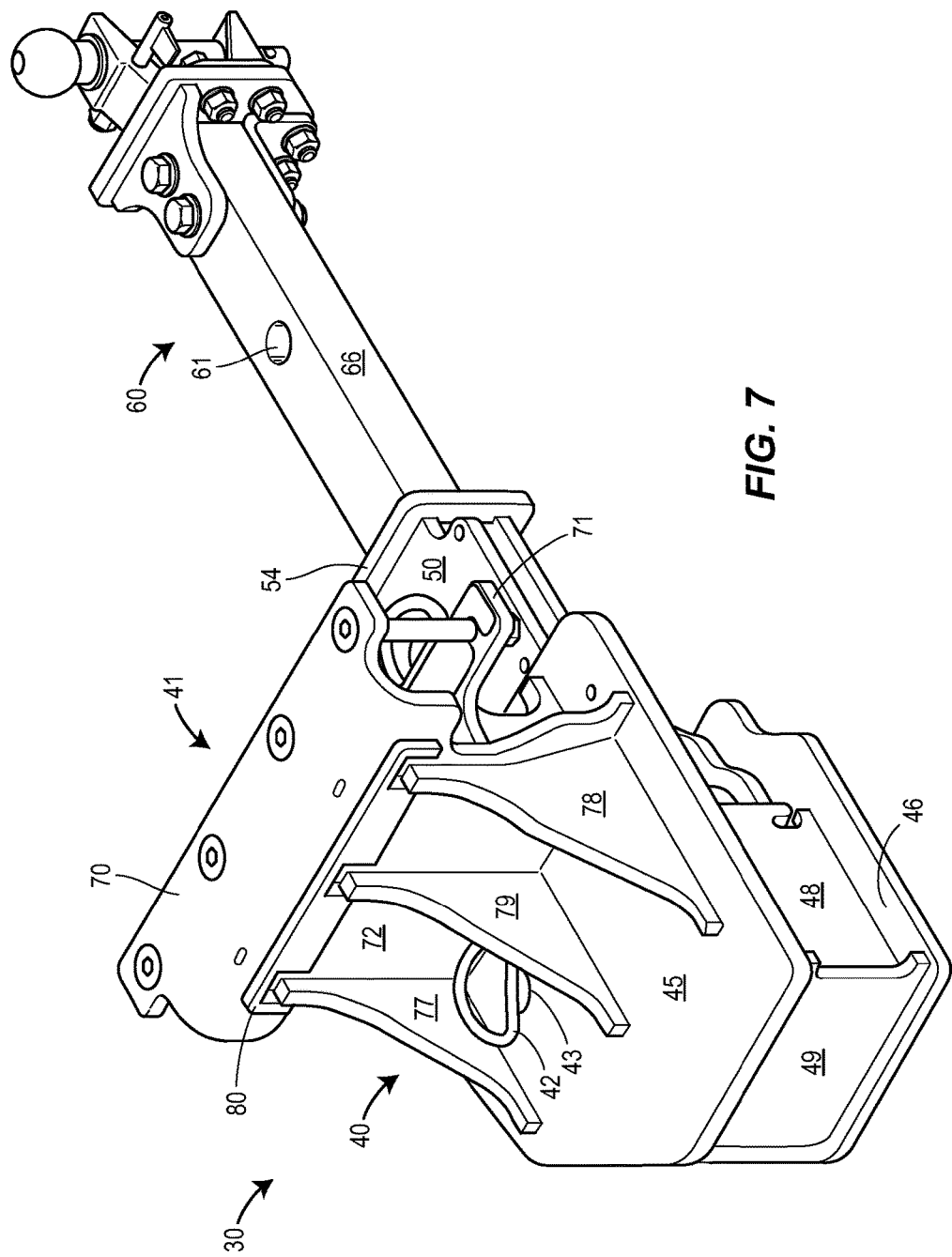
FIG. 7 is an isometric view of the tow hitch assembly of FIG. 1 in a deployed position.

With reference to FIGS. 5 to 7 it can be seen that the first member 50 is mounted pivotally about the pivot axis P in a horizontal plane relative to the body 40. The elongate body 66 of the second member is received in sliding engagement, longitudinally within the internal section 84 of the first member 50.

The second end 53B of the first member 50 is partially received between the first planar section 45 and second planar section 46 of the body 40. The first member 50 is retained between the first and second planar sections 45 and 46 of the body 40 by the pivot pin 92. The pivot pin 92 permits only rotational movement of the first member 50 about the pivot axis P relative to the body 40. The pivot pin 92 is positioned through the coaxial holes in the first planar section 45 and the second planar section 46 of the body 40, and the central bore of tube 57 such that the first member 50 and body 40 can be rotated relative to one another about pivot axis P.

Tow hitch 32 is removably mounted to the mounting flange 63 of the second member 60 by four tow hitch bolts 34. The tow hitch bolts 34 secure the removable tow hitch 32 to the mounting bracket 64 via the tow hitch holes 36.

The second member 60 is retained within the first member 50 by the pin 59. Pin 59 is removably inserted in holes 58 of the first member 50 and through holes 61 or 62 of the second member 60. The pin 59 prevents longitudinal movement of the second member 60 within the first member 50.

Relative rotation of the first member 50 and the body 40 is prevented by the pin 42. The pin 42 is removably inserted through the hole 43 in the first planar section 45 of the body 40 through the tube 55 or tube 56 into the lock hole 43 in the second planar section 46 of the body 40, thereby making the first member 50 rotationally fast with the body 40.

Operation of the Tow Hitch Assembly

Figure 4:
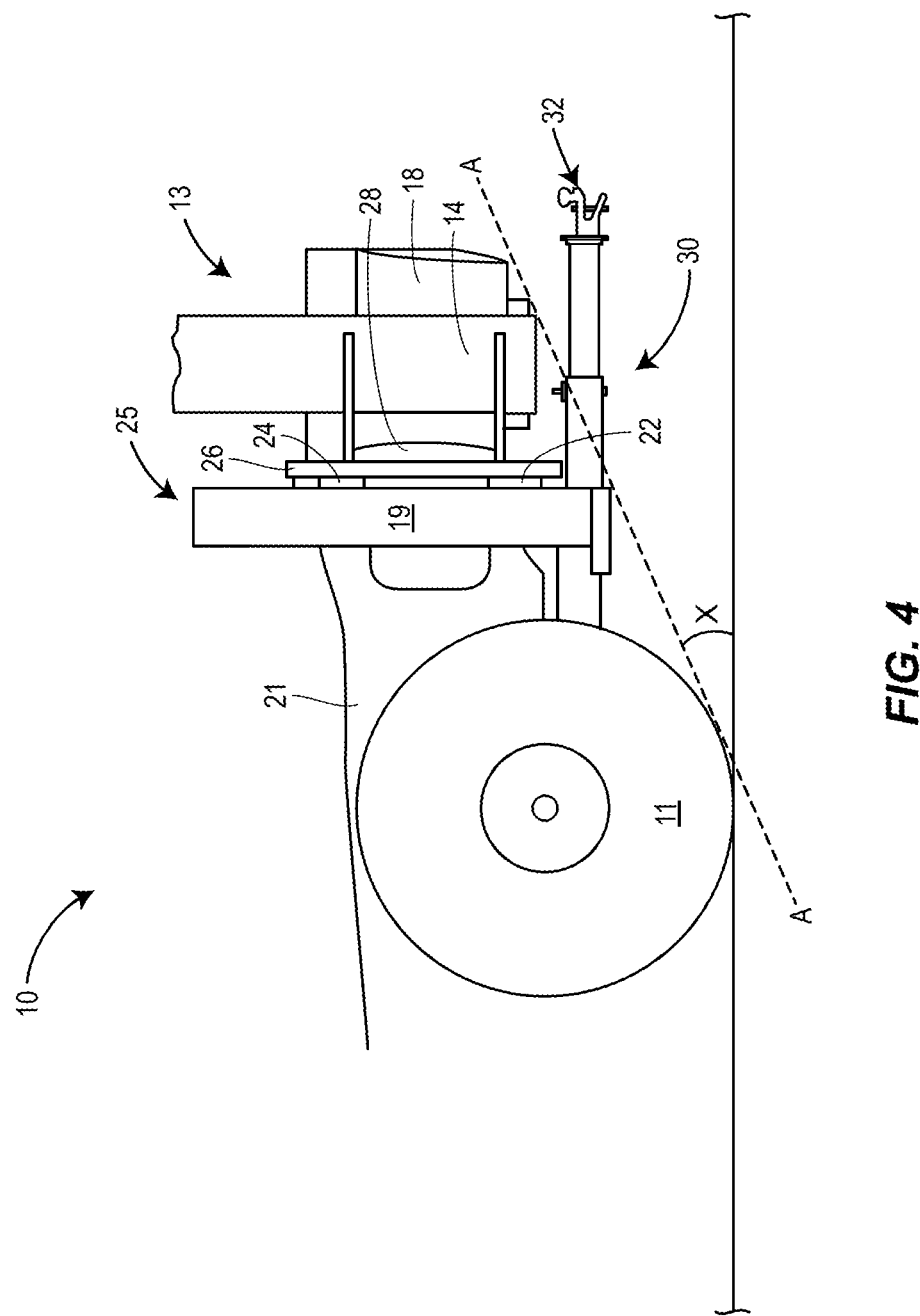
FIG. 4 is a left hand side elevation of the vehicle of FIG. 1 including the tow hitch assembly in a deployed position.

When the vehicle 10 is being operated, the tow hitch assembly 30 has two modes of operation. Either the tow hitch 30 is situated in a stowed position as shown in FIGS. 1, 2, 5 and 9, or the tow hitch assembly 30 is situated in a deployed position as shown in FIGS. 4 and 7. When the backhoe 13 of the vehicle 10 is in operation, the tow hitch assembly 30 will be positioned in the stowed position to avoid any risk of the backhoe 13 contacting the tow hitch assembly 30. When the vehicle 10 is required for a towing operation the tow hitch assembly 30 will be moved from the stowed position to the deployed position. To move the tow hitch assembly from the stowed position to the deployed position the tow hitch assembly must be first rotated and then extended. That is, pin 42 is lifted to permit rotation of the first member 50 from a position parallel to the stowed axis S, to a position where it is longitudinally aligned with the deployed axis D (see FIG. 9), pin 42 is then repositioned to prevent further rotation of the first member 50 about the pivot axis P. Next pin 59 is lifted such that the second member 60 can be slid rearwards of the vehicle 10 along the deployed axis D. When the second member 60 reaches the deployed position the pin 59 is lowered to prevent any further movement of the second member 60.

Referring to FIG. 5, the tow hitch assembly 30 is shown in a stowed position. The stowed position is defined by the first member 50 and second member 60 being orientated parallel to the front plate 72 of the body 40, and, the lock member 42 being in position in holes 43 in the first planar section 45 and second planar section 46 through the tube 55, thereby preventing rotation of the first member 50 relative to the body 40, and, the second member 60, is positioned within the first member 60 such that the lock device 59 can be inserted through holes 58 in the first member 50, through holes 61 in the second member 60, thereby preventing the second member 60 from sliding longitudinally relative to the first member 50.

Referring to FIG. 6 the tow hitch assembly 30 is shown in a rotated position.

In the rotated position the first member 50 including the second member 60 have been rotated 90° counter clockwise about the pivot axis P. To allow the tow hitch assembly 30 to be moved from the stowed position as shown in FIG. 5 to the rotated position as shown in FIG. 6, the pin 42 is extracted from the lock hole 43. The first member 50 including the second member 60 are then rotated manually by an operator 90° counter clockwise (when viewed from above). That is, the first member 50 including the second member 60 are rotated from the stowed position where they are aligned longitudinally with the transverse axis T and parallel to the first web 47, to the rotated position where the first member 50 and second member 60 are perpendicular relative to the transverse axis T, and parallel to the second web 48.

To secure the tow hitch assembly 30 in the rotated position, pin 42 is reinserted into lock hole 43 in the first planar section 45 of the body 40, through tube 56 of the first member 50, into the lock hole 43 in the second planar section 46 of the body 40.

Referring to FIG. 7 the tow hitch assembly shown in a deployed position.

In the deployed position, the first member 50 including the second member 60 has been rotated 90° counter clockwise about pivot axis P and secured in position by pin 42 as described above with reference to FIG. 6. In addition, the pin 59 has been extracted from holes 58 of the first member 50 and from the holes 61 in the top and bottom of the second member 60 thereby allowing the second member 60 to slide longitudinally within the first member 50.

Once the second member 60 has been moved longitudinally relative to, i.e. slid within the first member 50, pin 59 is reinserted into a hole 58 in the top and bottom surfaces of the first member 50, intersecting the elongate body 66 of the second member 60, through holes 62 in the elongate body 66. The reinsertion of pin 59 prevents any further longitudinal movement of the second member 60 relative to the first member 50.

Figure 9:
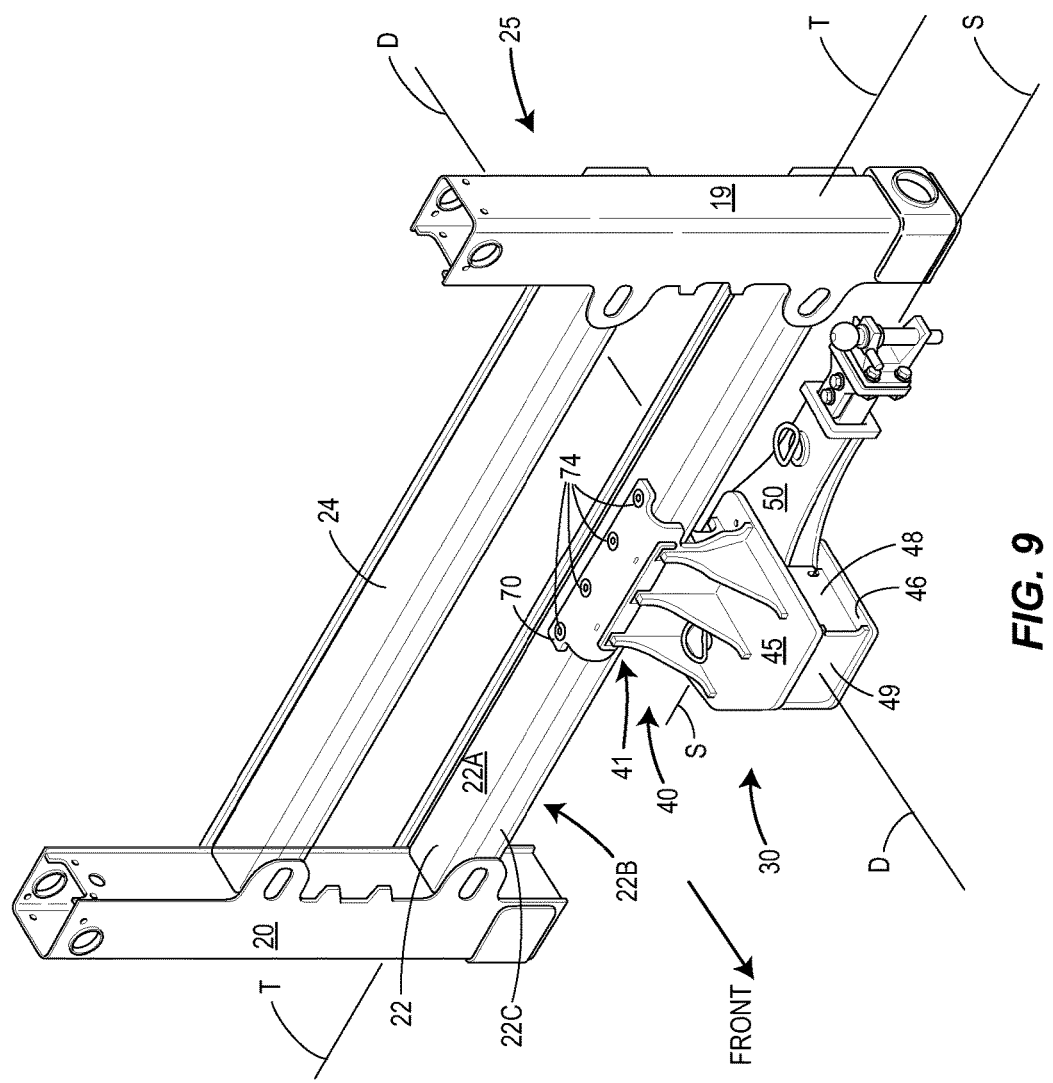
FIG. 9 is an isometric view of the tow hitch assembly mounted to a cross rail of the vehicle of FIG. 1.

With reference to FIG. 9, the tow hitch assembly 30 is shown in a stowed position. The tow hitch assembly 30 is removably mounted to the lower cross rail 22 of the rear chassis frame 25 of the vehicle 10.

The channel in the upper portion of the F-shaped mounting portion 41 of the tow hitch assembly 30 is partially received around the lower cross rail 22 of the vehicle 10, such that the front plate 72 of the mounting portion 41 covers the forwards facing face of the lower cross rail 22. The first arm 70 is positioned on the top surface 22A of the lower cross rail 22 and the second arm 71 is positioned on the bottom surface 22B of the lower cross rail 22, such that mounting portion 41 of the body 40 partially encloses the lower cross rail 22. The mounting portion 41 of the body 40 is secured in position relative to the lower cross rail 22 by four bolts 74 that are received through holes 73 in the first arm 70 through holes (not shown in the lower cross rail 22 and through corresponding holes in the second arm 71 and secured with a nut in a conventional manner. The lower cross rail 22 is sandwiched between the first arm 70 and second arm 71.

Two shims 76 are provided (see FIG. 8). The shims 76 are thin gauge sheet and substantially the same. A first shim 76 is positioned between the first arm 70 and the lower cross rail, the other shim 76 positioned between the second arm 71 and the lower cross rail 22 in a conventional manner.

The mounting portion 41 is positioned on the forward facing side 22C of the lower cross rail 22 so that the rear facing side of the lower cross rail is unobstructed. Since the rear facing side of the lower cross rail 22 is unobstructed the yoke 26 (see FIG. 1) which is slideably mounted to the upper and lower cross rails 24 and 22, can move laterally along the rear chassis frame 25 in parallel to the transverse axis T in an uninhibited manner.

Referring to FIG. 2 which shows the vehicle 10 and the tow hitch assembly 30 in a stowed position it can be seen that no part of the tow hitch assembly 30 protrudes rearward of the vehicle past the departure clearance line A. Advantageously, the tow hitch assembly 30 when in the stowed position has no effect on the departure angle X of the vehicle 10 and as such the approach and departure capabilities of the vehicle 10 are unhindered.

Also, since the tow hitch assembly when in the stowed position does not protrude rearward of the vehicle beyond the yoke 26 there is no risk of any part of the backhoe 13 unintentionally contacting any part of the tow hitch assembly 30.

Referring to FIG. 4, the tow hitch assembly 30 is shown in a deployed position. In this position the tow hitch assembly 32 protrudes rearward from the vehicle past the bucket 18 of the backhoe 13. Since the tow hitch 32 is protruding further rearward from the vehicle 10 and the backhoe 13 and/or bucket 18 it allows an operator to hitch a trailer or machine to the tow hitch 32 safely, easily, and unhindered by the backhoe 13.

As will be appreciated, the tow hitch will only be positioned in the deployed position when towing a trailer or the like. Under these circumstances the vehicle is likely to be travelling on relatively flat terrain, and hence the departure angle is not a significant consideration when the vehicle is towing a trailer or the like.

Figure 10:
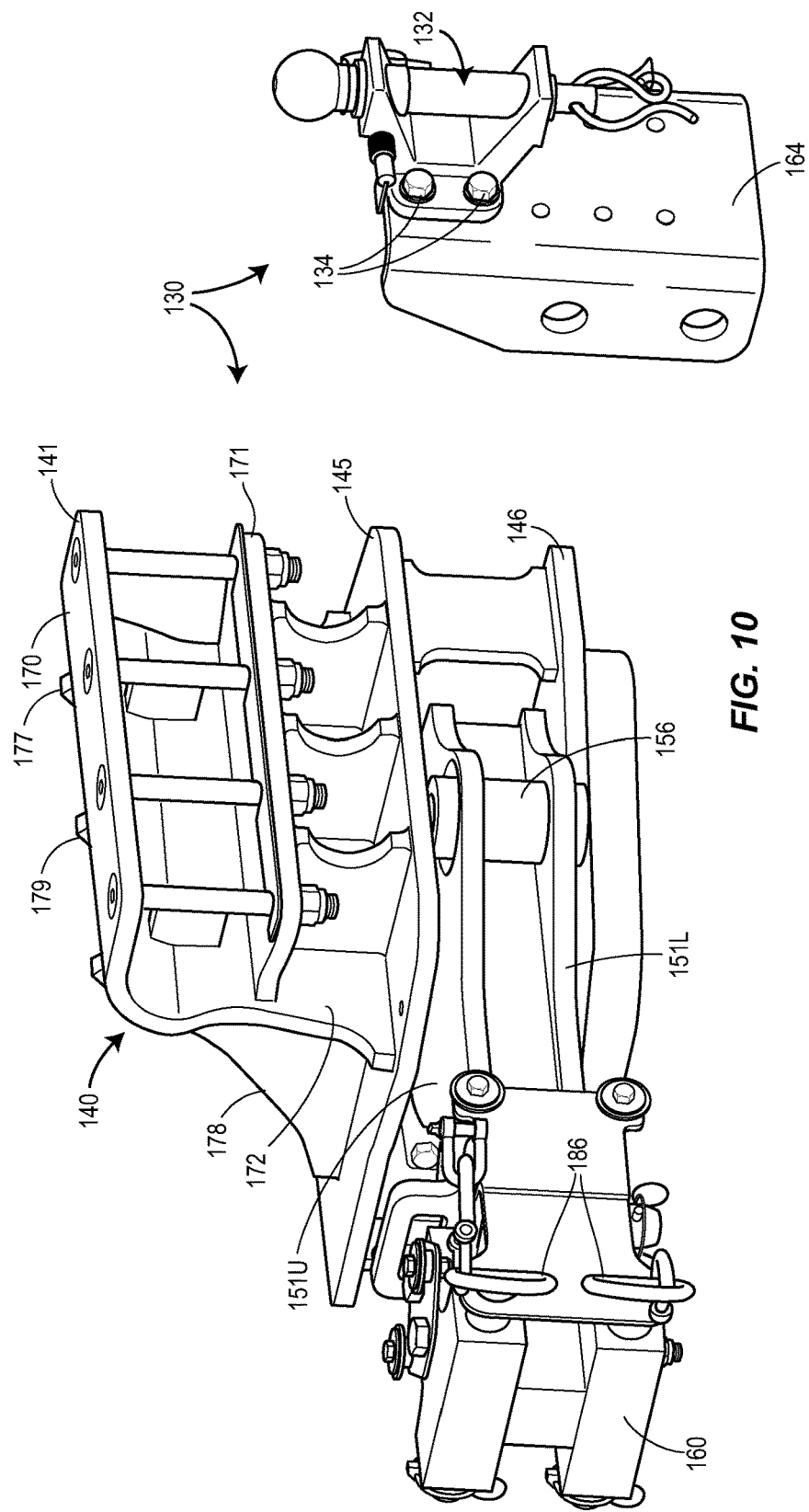
FIG. 10 is an isometric view of a further embodiment of a tow hitch assembly according to the present invention in a stowed position.
Figure 11:
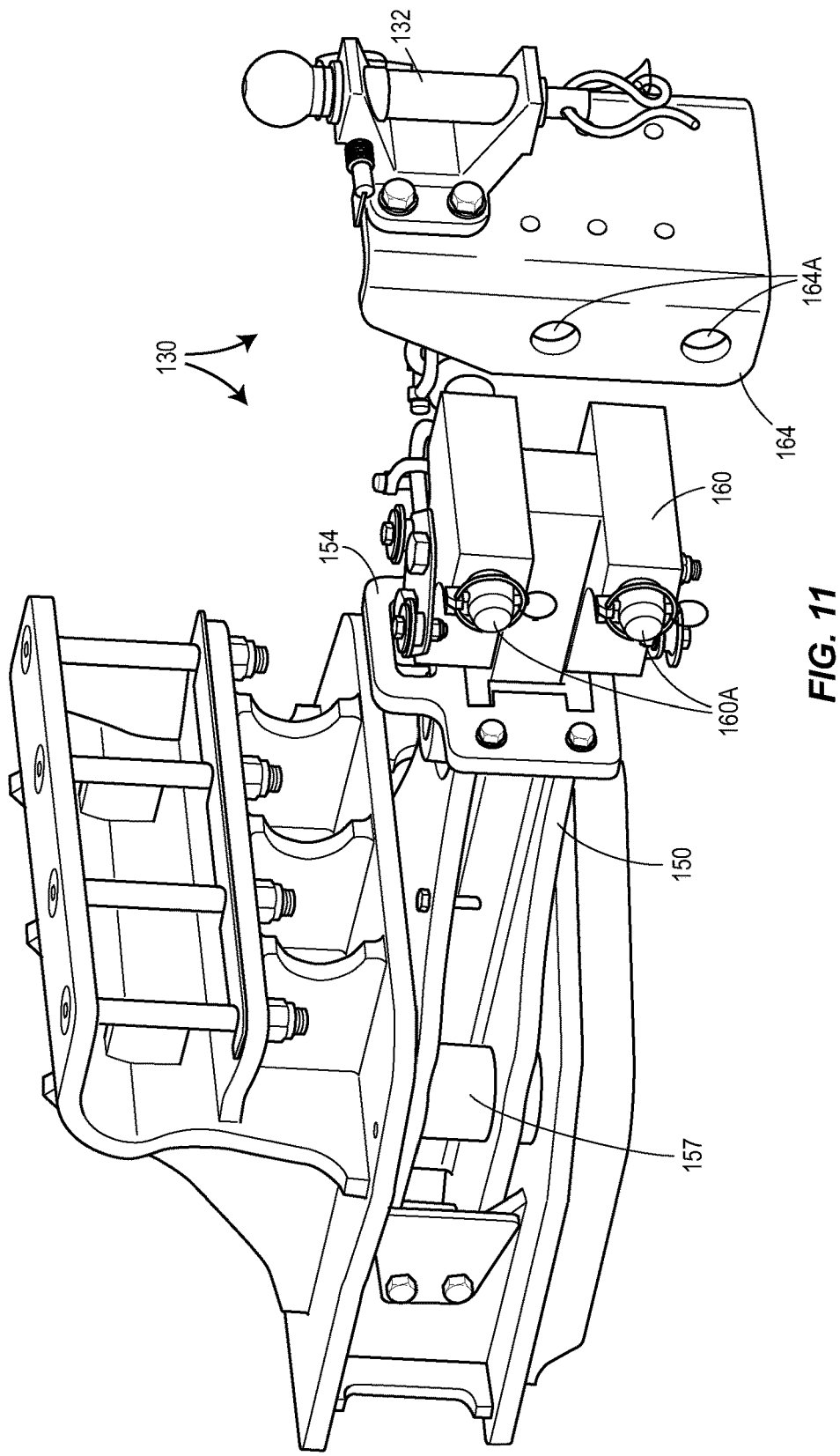
FIG. 11 is an isometric view of the tow hitch assembly of FIG. 10 in a rotated position.
Figure 12:
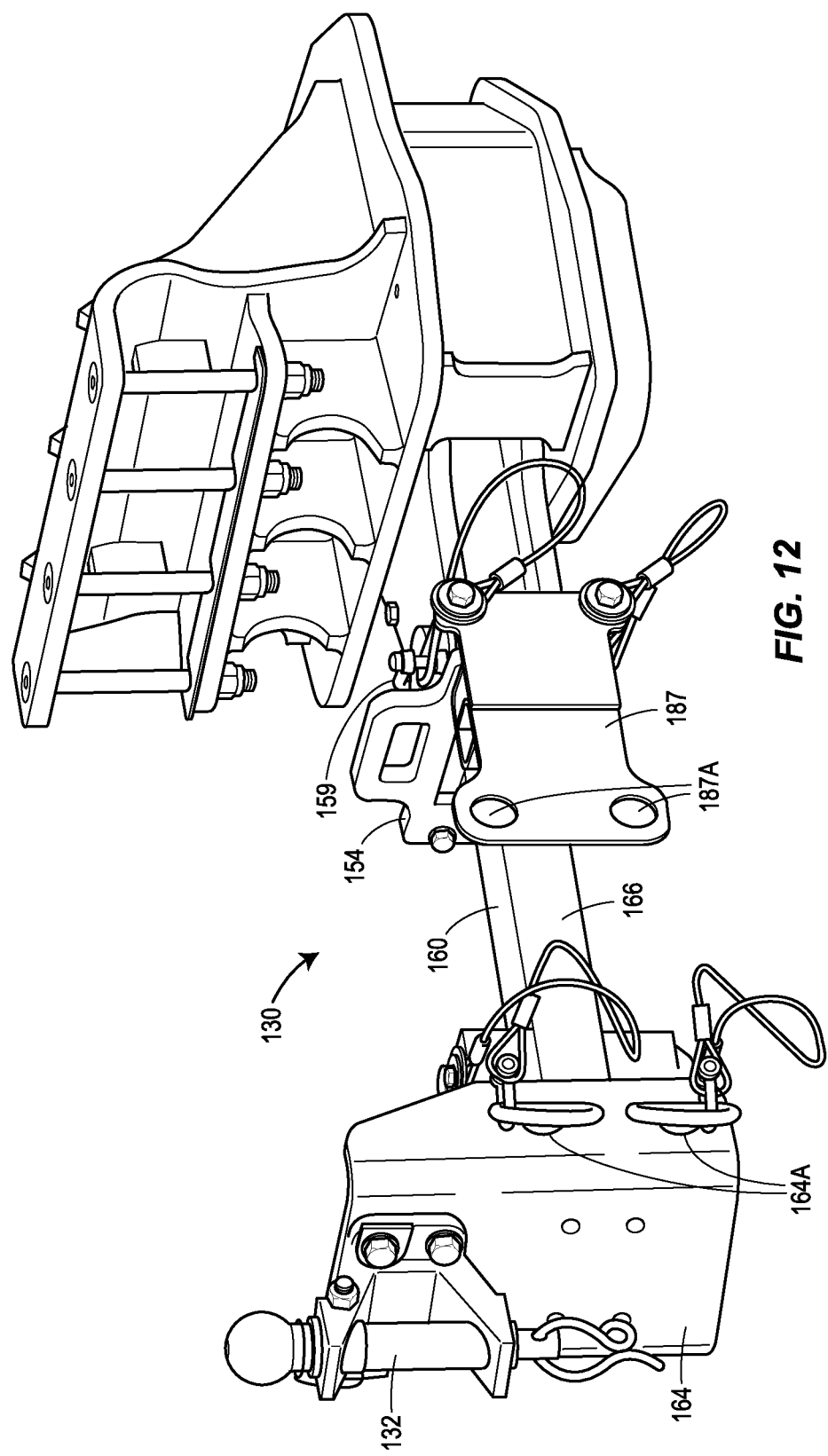
FIG. 12 is an isometric view of the tow hitch assembly of FIG. 10 in a deployed position.

With reference to FIGS. 10 to 12 there is shown a second embodiment of a tow hitch assembly 130 in which components which fulfill substantially the same function as those of tow hitch 30 are labeled 100 greater.

In this case the mounting bracket 164 is quickly detachable, it being mounted on the second member 160 via two quickly releasable pins 186 which pass through holes 164A in the mounting bracket 164 and also pass through holes 160A in the end of the second member 60. The tow hitch 132 is secured to the mounting bracket 164 via four bolts 134.

FIG. 12 shows the mounting bracket 164 and tow hitch 130 secured to the end of the second member 60 via pins 186. In order to stow the tow hitch assembly, the pins 186 are removed, allowing removal of the mounting bracket 164. Then the second member 160 is slid longitudinally relative to the first member to the position shown in FIG. 11 and secured in place by the lock device 159. The pins 186 pass through corresponding holes 187A in bracket 187 to additionally secure the second member longitudinally relative to the first member 150. Then, in order to move the tow hitch assembly to the stowed position as shown in FIG. 10, the pin equivalent of lock member 42 is removed, the first member is rotated to the position shown in FIG. 10 and the pin equivalent of lock member 42 is replaced.

As can be seen the tow hitch 132 and mounting bracket 164 are separate from a tow hitch assembly when a tow hitch assembly is in the stored position. The tow hitch 132 and mounting bracket 164 can be stowed elsewhere on the vehicle, for example within the cab of the vehicle.

As will be appreciated, the tow ball height of a trailer or the like is designed to suit the trailer. Accordingly the towing vehicle must provide a tow ball at the appropriate height for the towed trailer. For certain machines, in particular relatively small back hoe loaders, the back hoe, when in the stored position is relatively low as are other parts of the back hoe loader. Thus, for certain tow vehicles it is advantageous to have a relatively light tow hitch 132 and associated bracket 164 which can easily and quickly be removed prior to moving the tow hitch assembly to the stored position. When the tow hitch assembly is deployed, it is relatively easy to attach the tow hitch 132 and associated bracket 164 to the tow hitch assembly when in the deployed position shown in FIG. 12 via the quick fit pins 186.

As described above, the tow hitch 32 and 132 is a conventional detachable flange, ball and pin tow hitch. In further embodiments any type of tow hitch can be used, in particular any tow hitch which is compatible with the towing features on a trailer or the like can be used.

The invention claimed is:

1. A tow vehicle, the tow vehicle being a material handling machine, including:
   a tow hitch assembly having a body for mounting the tow hitch assembly relative to the tow vehicle, a first member rotatably mounted relative to the body and a second member slideably mounted relative to the first member,
   the tow hitch assembly having a stowed position at which the first member is locked in a first rotational position relative to the body and the second member is locked in a first longitudinal position relative to the first member and
   the tow hitch assembly having a deployed position suitable for towing at which the first member is locked in a second rotational position relative to the body, the second member is locked in a second longitudinal position relative to the first member and a tow hitch is secured to the second member, the body being secured to a part of the tow vehicle when the tow hitch assembly is in the stowed position and the body being secured to the part of the tow vehicle when the tow hitch assembly is in the deployed position,
   wherein the material handling machine is a back hoe loader and when the tow hitch assembly is in the deployed position the second member extends under a back hoe of the back hoe loader when the back hoe is in a stowed position.

2. A tow vehicle as defined in claim 1 wherein the first member is rotatably mounted via a pivot having a pivot axis that, in use, is substantially vertical.

3. A tow vehicle as defined in claim 1 wherein the first member can be locked in the first rotational position and the second rotational position by a lock member.

4. A tow vehicle as defined in claim 3 wherein the lock member engages a first part of the body and a first part of the first member to lock the first member in the first rotation position and the lock member engages the first part of the body and a second part of the first member to lock the first member in the second rotation position.

5. A tow vehicle as defined in claim 3 wherein the lock member engages a first part of the body and a first part of the first member to lock the first member in the first rotation position and the lock member engages a second part of the body and the first part of the first member to lock the first member in the second rotation position.

6. A tow vehicle as defined in claim 1 wherein the second member can be locked in the first longitudinal position and second longitudinal position by a lock device.

7. A tow vehicle as defined in claim 6 wherein the lock device engages a first region of the first member and a first region of the second member to lock the second member in the first longitudinal position and the lock device engages the first region of the first member and a second region of the second member to lock the second member in the second longitudinal position.

8. A tow vehicle as defined in claim 6 wherein the lock device engages a first region of the first member and a first region of the second member to lock the second member in the first longitudinal position and the lock device engages a second region of the first member and the first region of the second member to lock the second member in the second longitudinal position.

9. A tow vehicle as defined in claim 1 wherein the first member includes a tube within which is slideably mounted the second member.

10. A tow vehicle as defined in claim 1 wherein the body has a first planar section connected to a second planar section, the first planar section being generally parallel to the second planar section wherein the first member is partially received between the first planar section and the second planar section.

11. A tow vehicle as defined in claim 10 wherein the first member is rotatably mounted via a pivot pin wherein the pivot pin engages the first planar section and the second planar section.

12. A tow vehicle as defined in claim 10 wherein the first planar section is connected to the second planar section via a first web and a second web.

13. A tow vehicle as defined in claim 12 wherein the first web is orientated at substantially 90° to the second web to allow the first member to rotate through 90° or substantially 90°.

14. A tow vehicle as defined in claim 1 wherein the body has a mounting feature to allow the tow hitch assembly to be mounted to an associated tow vehicle.

15. A tow vehicle as defined in claim 1 wherein the tow hitch is secured to the second member when the second member is in the stowed position.

16. A tow vehicle as defined in claim 1 wherein the second member is elongate and defines a longitudinal axis and when the tow hitch assembly is in the stowed position the longitudinal axis extends laterally relative to the material handling machine.

17. A tow vehicle as defined in claim 1 wherein:
the body has a mounting feature to allow the tow hitch assembly to be mounted to the tow vehicle, and
the mounting feature has a generally U-shaped cross section having a first arm and a second arm and the first arm is positioned on one side of a chassis beam of the material handling machine and a second arm is positioned on an opposite side of the chassis beam.

18. A tow vehicle as defined in claim 17 wherein:
the tow hitch is secured to the second member when the second member is in the stowed position,
the second member is elongate and defines a longitudinal axis and when the tow hitch assembly is in the stowed position the longitudinal axis extends laterally relative to the material handling machine, and
the mounting feature at least extends around a front of the chassis beam and the back hoe is laterally slideably mounted on the chassis beam and positioned behind the chassis beam.

\* \* \* \* \*